United States Patent Office 3,267,760
Patented August 23, 1966

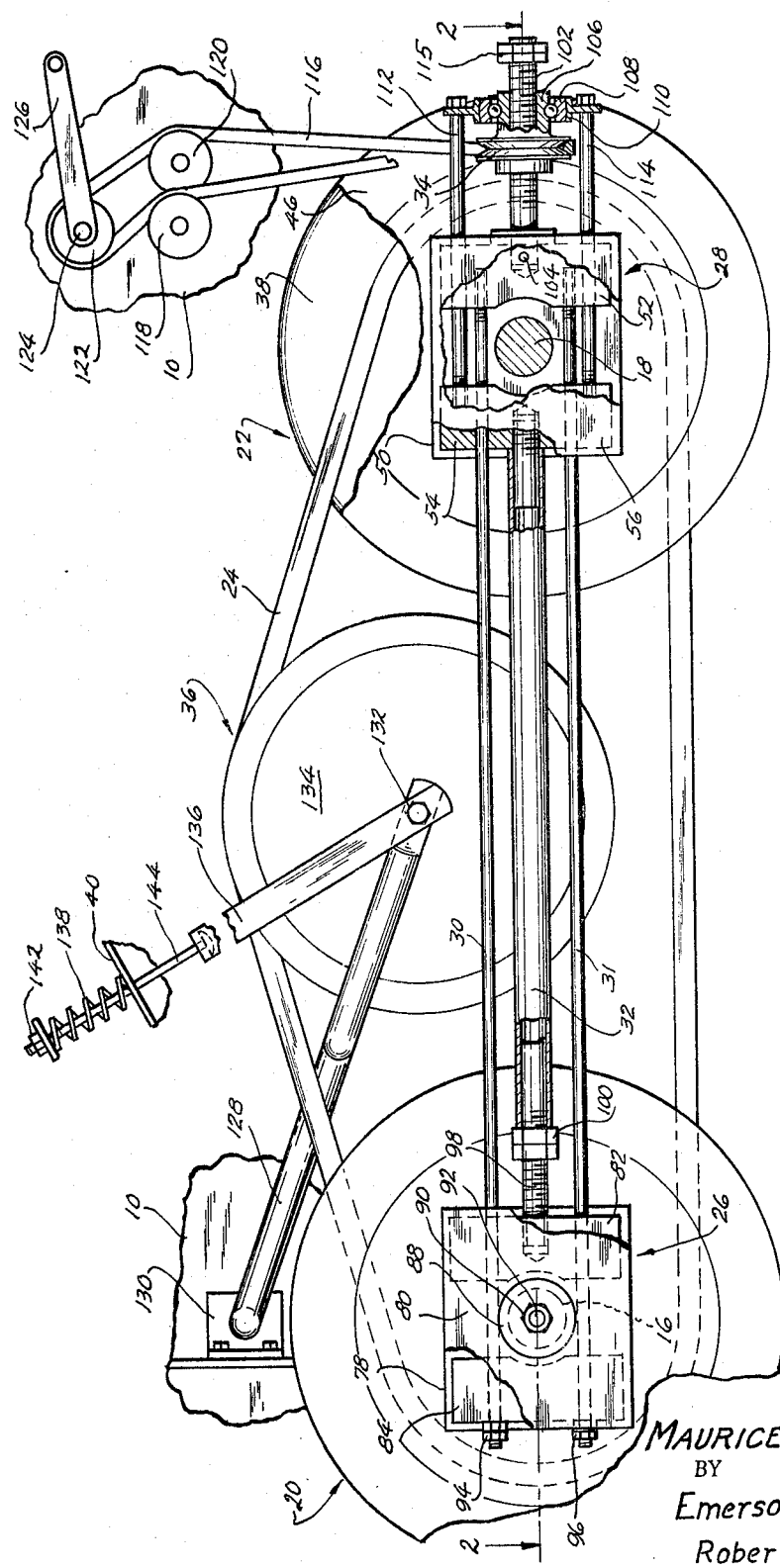

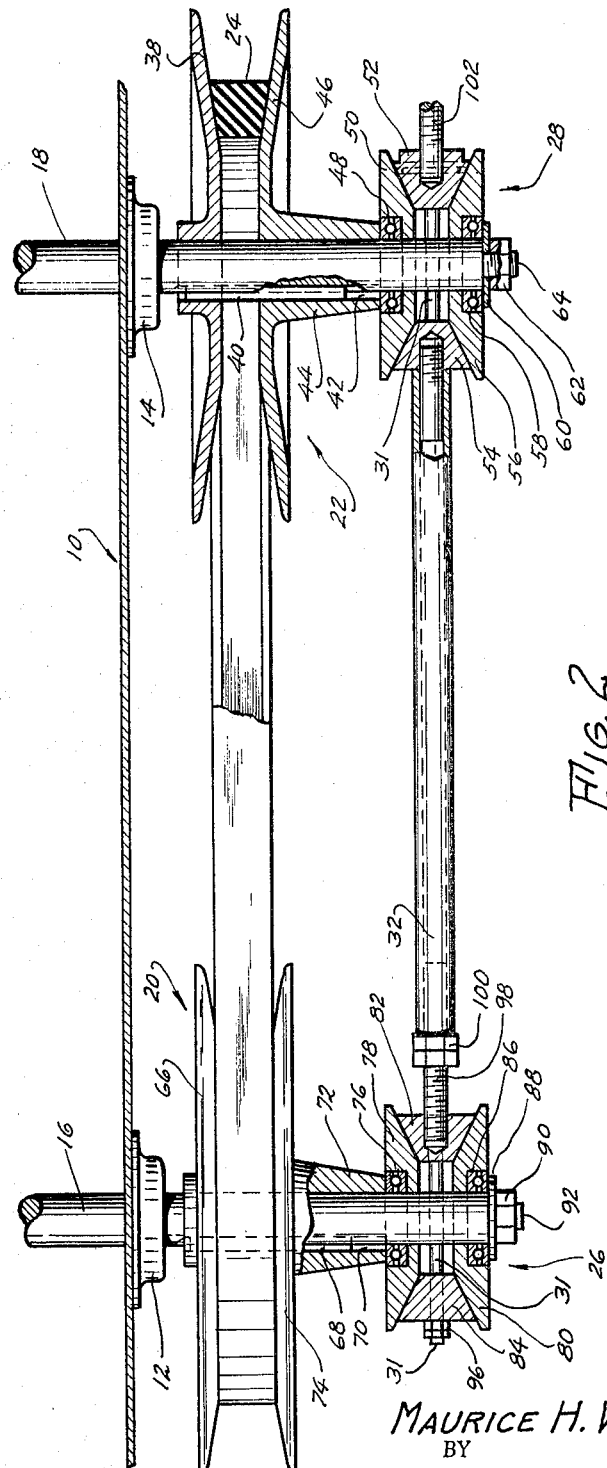

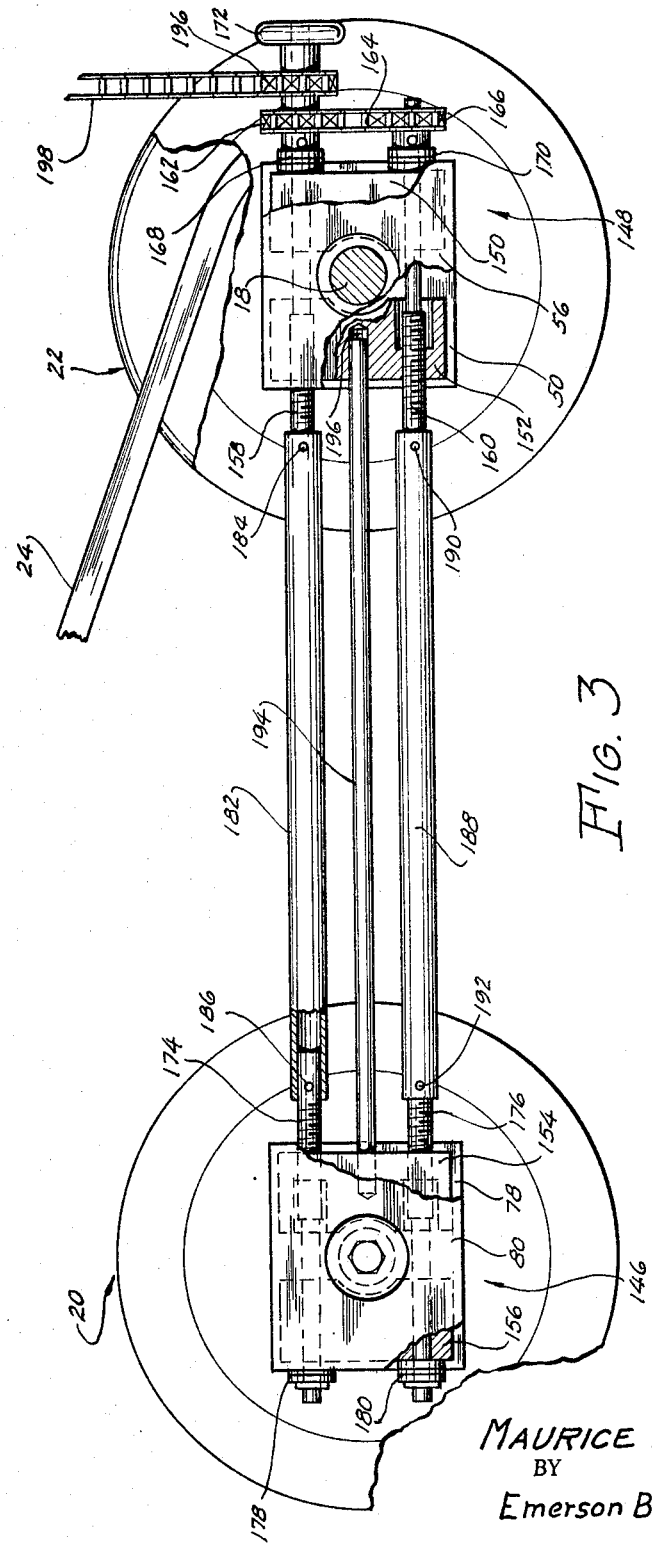

3,267,760
TRANSMISSIONS
Maurice H. Wenning, Moline, Ill., assignor to J. I. Case Company, Racine, Wis., a corporation of Wisconsin
Filed Apr. 30, 1964, Ser. No. 363,717
17 Claims. (Cl. 74—230.17)

The present invention relates to variable ratio belt drives, and particularly to the actuating mechanism therefor, and an object is to generally improve the construction and operation of devices of this kind. Variable ratio drives have been known for a long time, in which a so-called V belt is engaged with spaced sheaves, the sheaves being formed of shiftable flanges which engage the edges of the belt and which may be pressed together to cause the belt to run at a greater radius from the axis of the sheave. In a drive of this kind, such a change in the radius of action of the belt will change the ratio of the drive between one sheave and the other, as is well known. Commonly, both sheaves are changeable, and if one sheave is pressed together while the other is allowed to open, the ratio change will be much greater. Such sheaves might be said to be compressible, and a great many mechanisms have been devised for compressing the sheaves or allowing them to expand. These mechanisms have met with varying degrees of success, but all have left something to be desired.

One type utilizes a spring to compress one of the sheaves, and has mechanism for compressing the other sheave or allowing it to expand. This tends to require excessive pressure on the controlled sheave when it is desired to compress the latter, since it must develop enough force on the V belt to crowd the latter between the flanges of the other sheave against the spring pressure. To load the belt to reasonable capacity while preventing slipping, requires a rather heavy spring, and the pressure on the controlled sheave necessary to expand the opposing sheave becomes excessive and may tend to damage the belt.

Other types of mechanism may tend to displace the sheave carrying shafts with a substantial pressure in addition to the normal belt pull. This requires more than necessarily rugged bearings in order to satisfactorily withstand the extra load, and also more rugged structure to support the bearings than would otherwise be necessary.

Other types require a rugged support of some kind on the stationary frame of the machine to which the drive is applied. Still others result in a strong axial thrust in one or the other or both of the shafts, which must be provided against by oversize bearings and extra strength, weight and cost in the machine, and which otherwise might not be necessary.

While some sort of a remote control for such a speed changing mechanism could be very useful, prior devices have not lent themselves particularly well to the application of such controls, particularly on large lightly built machines, such as combines; since weaving or distortion of the machine in its travel over the ground could cause displacement of the speed control in relation to the control element of the remote control so that the speed or ratio of the drive would be changed when not desired.

The invention contemplates the provision of a self-contained control for a variable V belt drive which rides on the spaced shafts and needs no other support. No connection to a fixed part of a machine is necessary, and there is no substantial resultant thrust in any direction which needs to be withstood by the shafts, their supports, or any other part of the machine. The compression of either sheave is relieved when the other is compressed, and for this reason the belt is not excessively compressed when speeds are being changed. Furthermore, an accurate remote control is practical regardless of distortion of the machine, since no reference points other than in the control itself, and possibly certain idlers, are necessary on the machine.

Accordingly, the major object of the invention is to provide a variable V belt drive with a control mechanism which is self-contained; does not excessively compress the belt; which requires no fixed reference points on the machine to which it is applied; introduces no significant resultant thrust on the shafts other than the normal pull of the belt; and which may be accurately controlled from a remote point in spite of distortion of the machine on which the device is mounted. Further objects and advantages will become apparent from the following specification and accompanying drawings in which:

FIGURE 1 is a side elevation of a device embodying the invention with parts broken away to show what lies beneath;

FIG. 2 is a plan view of the same, largely in section on the line 2—2 of FIG. 1; and FIG. 3 is a view similar to FIG. 1 of a modification.

Similar reference characters have been applied to the same parts wherever they occur throughout the drawings and specification.

The device constituting a preferred form of the invention is carried by a wall 10 which may represent part of a combine or other machine having need of such a variable speed drive. Carried on wall 10 in bearings 12 and 14, FIG. 2, are spaced substantially parallel shafts 16 and 18. Shaft 16 carries a compressible sheave generally designated as 20, while shaft 18 carries a similar compressible sheave generally designated as 22, the sheaves being connected by a V belt 24.

Sheaves 20 and 22 are controlled or compressed by the action of thrust block assemblies 26 and 28, which are carried on shafts 16 and 18 respectively, and which operate to control sheaves 20 and 22. Thrust block assemblies 26 and 28 are so connected, as will be fully described, that when one thrust block is expanded, for example 28 so as to compress sheave 22, the other thrust block 26, is relaxed so that belt 24 may expand sheave 20 without exerting substantially more than its normal outward pressure, resulting from the power being transmitted. Thrust block assemblies 26 and 28 are connected with each other through tension members 30 and 31, and a compression member 32, as will be fully described, so that when either one of thrust block assemblies 26 and 28 is expanded, the other will be free to contract.

Thrust block assembly 28 may be expanded at will by actuation of a combined driven wheel or pulley and nut or rotatable element 34, and a belt tightener generally designated as 36 may be provided to keep approximately a predetermined tension on belt 24.

Returning to a more detailed description of the device, shaft 18 has a flange 38 fixed thereon to form part of above-mentioned sheave 22. In the present instance, a key 40 prevents rotation of flange 38 except together with shaft 18. Key 40 extends along shaft 18 into a groove 42 within a hub portion 44 of a movable flange 46, slidable on shaft 18, key 40 having a free running fit in groove 42 so that flange 46, although prevented from rotating relative to shaft 18, may slide thereon toward and away from flange 38.

Hub portion 44 contacts a low friction bearing 48, forming a part of thrust block assembly 28, and received in a wedge block 50. Wedge block 50 is maintained in position axially of shaft 18 as will appear, and journaled thereon by means of bearing 48, and a pair of camming or wedging means 52 and 54 is engaged with wedge block 50 and also with a wedge block 56 journaled on shaft 18 by means of a low friction bearing 58 received in wedge block 56. Bearing 58 is engaged with an abutment or washer 60 fixed on shaft 18 in any suitable manner, as for example by a nut 62 threaded on a reduced portion 64 on shaft 18.

Assuming inward pressure of belt 24, which would be normal, the belt pressure would force flange 46 in the direction to slide bearing 48 in wedge block 50 in a direction toward wedge block 56, tending to force wedging means 52 and 54 outwardly from the space between wedge blocks 50 and 56, or in other words, away from shaft 18, and the pitch or angle of wedging means 52 and 54 is steep enough so that they can be forced out, when permitted by their controlling means, from between wedge blocks 50 and 56, by the pressure of flange 46. By virtue of low friction bearings 48 and 58, it will be apparent that wedge blocks 50 and 56 may be held stationary, by means which will be described, during the rotation of shaft 18 without undue frictional losses, even under heavy load and with substantial outward pressure on flange 46. It will also be apparent that if wedging means 52 and 54 are forced inwardly, or toward shaft 18, wedge blocks 56 and 50 will be pried apart so that wedge block 50 will be moved and will cause movement of flange 46 in a direction toward flange 38, thereby causing belt 24 to travel on a larger radius or pitch circle between flanges 38 and 46 or in sheave 22, than it did before.

A substantially identical construction is preferably arranged on shaft 16, a flange 66 being fixed on shaft 16 by means of a key 68 which is slidable in a groove 70 in a hub portion 72 of a flange 74. Hub portion 72 is in contact with a low friction bearing 76 received in a wedge block 78 as in the case of above-mentioned wedge block 50.

Wedge block 78 is spaced from a wedge block 80 by wedging means 82 and 84, wedge block 80 receiving therein a low friction bearing 86 which is backed up by an abutment 88 held in place by a nut 90 on a reduced portion 92 of shaft 16.

It will now be apparent that if wedging means 52 and 54 are forced inwardly or toward shaft 18 while wedging means 82 and 84 are allowed to be pressed outwardly or away from shaft 16 an equivalent distance, sheave 22 will be compressed a predetermined amount while sheave 20 will be expanded (by the outward pressure of belt 24), the same amount. Belt 24 will therefore run on a larger pitch or belt circle, or at a larger radius than before in sheave 22, while, because of the expansion permitted in sheave 20, belt 24 will run on a shorter radius or smaller pitch or belt circle in sheave 20. Sheave 22 will then run at a slower speed in relation to sheave 20 than it did before.

If the situation is reversed and wedging means 82 and 84 are forced toward shaft 16 while wedging means 52 and 54 are allowed to be pressed away from shaft 18, the belt circle in sheave 20 will be increased while the belt circle in sheave 22 will be reduced with the opposite effect to that just described. In other words, sheave 22 will now be run faster in relation to sheave 20 than before. Connecting means 30, 31 and 32 provide for this action, as will now be described.

Wedging means 52 is preferably in the form of a wedge having its narrow edge facing toward shaft 18, as best seen in FIG. 1, while wedging means 54 is similar in shape, but reversed in position so as to have its narrow edge also facing shaft 18. Wedging means 52 and 54 may accordingly be said to be opposed and any resultant thrust imparted to wedge blocks 50 and 56 transverse to shaft 18 by wedging means 52 may be balanced or neutralized by an equal and opposing thrust in the opposite direction by wedging means 54. Wedging means 82 and 84 are similar and similarly related to shaft 16.

Tension member 30 passes in sliding relation through wedging means 54 and is threaded or otherwise suitably fixed in wedging means 52. On the opposite side of shaft 18, tension means 31 passes slidingly through wedge means 54 and is threaded or otherwise suitably fixed in wedging means 52. Tension member 30 also passes in sliding relation through wedging means 82 as does tension means 31, tension means 30 and 31 passing through wedging means 84, and in effect being fixed thereto by means of lock nuts 94 and 96.

Additionally, wedging means 54 is engaged with compression means 32 in the present instance in the form of a tube having slidable therein a threaded member 98 engaged in thrust relation with wedging means 82 and having lock nuts 100 engaged with threaded member 98, the assembly being in compression between wedging means 54 and 82. It will now be apparent that if a force is exerted tending to pull wedging means 52 to the right, as seen in FIG. 1, that tension members 30 and 31 will slide through wedging means 54 and 82 and pull wedging member 84 also to the right. Also if wedging means 54 is forced to the left (as would be the case if it were desired to expand sheave 22) this motion, through compression member 32 would force wedging means 82 to the left, expanding thrust block assembly 26 and compressing sheave 20. Conversely, if thrust block 26 were to be compressed by expanding of sheave 20 from the pressure of belt 24, tension rods 30 and 31 would pull wedging means 52 toward shaft 18, while movement of wedging means 82 would push, through compression means 32, wedging means 54 also toward shaft 18. Thus, if sheave 20 were to be expanded by the belt pressure, sheave 22 would be forced to contract a similar amount, and if sheave 22 were expanded by reason of belt pressure, sheave 20 would be forced to contract a similar amount.

Before proceeding with the remainder of the description, it is pointed out that any thrust in member 32 tending to displace or separate shafts 16 and 18 is exactly balanced by an equivalent tension in rods 30 and 31 tending to pull shafts 16 and 18 toward each other. There is therefore, no resultant displacing force against either of the shafts attributable to the sheave control means, so that no special precautions or supporting expedients are necessary in the relatively lightweight machine to which such a speed control is particularly adapted. Furthermore, each pair of wedging means as 52 and 54 balances the other, there being no direct connection to any stationary part of the machine which could shift to upset the adjustment of the speed control.

The entire device "rides on the shafts," and no reference point is necessary on any stationary part, and any slight tendency of thrust block assemblies 26 and 28 to rotate with shafts 16 and 18 will be effectively resisted by pull rods 30 and 31 which are engaged with all of the wedging means.

It is necessary to control one of the pairs of wedging means and for this purpose, a threaded shaft 102 is fixed in wedging means 52 as by a pin 104, and is engaged with abovementioned pulley nut 34 which has an internally threaded rotatable element or hub 106. Hub 106 is journaled in a low friction type of bearing 108 carried in a housing 110 fixed on a pair of spaced pull rods 112 and 114. Rods 112 and 114 pass slidably through wedging means 52 and are threaded in or otherwise fixed in relation to wedging means 54. Rotation of pulley nut 34 will tend to cause axial displacement of threaded shaft 102 as well as axial displacement in the opposite direction of rods 112 and 114. Thus, rotation of pulley nut 34 in one direction will push wedging means 52 between wedge blocks 50 and 56, while at the same time, it pulls wedging means 54 between wedge blocks 50 and 56. This action will tend to expand thrust block assembly 28 and compress sheave 22. Belt 24 will therefore be crowded outwardly between flanges 38 and 46 and thus more tightly between flanges 66 and 74 of sheave 20, to tend to pry them apart. This, as above described, will tend to force wedging means 82 and 84 out from between wedge blocks 78 and 80. This movement will be permitted by outward movement of wedging means 82 and 84, the aforesaid inward movement of wedging means 52 and 54 permitting, through tension rods 30 and 31 and compression member 32, such outward movement of wedging means 82 and 84. A lock nut 115 is provided on shaft 102 to limit travel of shaft 102 inwardly through hub 106.

From the above, it will be apparent that rotation of pulley nut 34 will cause the desired change in ratio between sheave 20 and sheave 22, and it is pointed out that, again as in the case of wedging means 52 and 54, the thrust on one wedging means is balanced by that on the other so that there is no resultant side thrust on shaft 18.

It is apparent that other means such as a hand wheel could be substituted for pulley 34 in order to adjust nut portion 106. Pulley 34, however, provides for convenient remote control of the speed control device.

As seen in FIG. 1, a belt or flexible element 116 engaged about pulley 34 is led to any convenient point over idler sheaves as 118 and 120 to a sheave 122 fixed on a shaft 124, having a crank or other manual actuating device 126. Rotation of crank 126 will, through belt 116 cause rotation of pulley 34 and adjustment of threaded shaft 102 in sleeve 106 so that the ratio of the drive may be readily controlled from wherever it is convenient to locate crank 126.

It is to be noted that shaft 102 and sleeve 106 are threadedly engaged and not likely to shift except intentionally by actuation of crank 126. On the other hand, if the distance to crank 126 is quite substantial, as for example, on a large combine, any distortion or weaving of the machine will have no tendency to change the adjustment of shaft 102 and sleeve 106, if any movement at all is induced, it being merely a minimal turning of crank 126. Crank 126 may be mounted on any convenient part of the machine, its location in relation to pulley 34 not being critical. Furthermore, if the distance changes during operation, no difficulty results.

It is contemplated that a power operated control mechanism might be substituted for crank 126 and connected to pulley 34 by means of a belt similar to 116. A sprocket might be substituted for pulley 34 and driven by a suitable chain, within the contemplation of the invention.

Since the displacement of one pair of wedging means is substantially exactly balanced by an equivalent displacement of the other pair of wedging means, all the wedging means preferably being alike, one sheave will be expanded exactly the same amount that the other is compressed so that there will be a minimal amount of change in the tension in belt 24. However, for best results, tightener 36 is utilized and comprises a support arm 128 journaled in a bearing 130 fixed on the frame 10 of the machine and carrying a pivot pin 132. A sheave 134 is journaled on pin 132 and engaged with belt 24 within the loop formed thereby. Arm 128 is urged upwardly in FIG. 1, by means of a yoke or arm 136 pivoted on pin 132 and urged upwardly by a spring 138 seated on a bracket 140 on frame 10 and engaged by means of an abutment or adjusting nut 142 with a pull rod 144 connected in any suitable manner with yoke 136. In this manner, sheave 134 is yieldingly urged upwardly against the "inside" of belt 24 and maintains a suitable tension thereon.

In order to adjust the relation between wedging means 52 and 84, above-mentioned lock nuts 94 and 96 may be adjusted, and in order to establish the correct relation between wedging means 54 and 82, lock nuts 100 may be adjusted relative to threaded member 98. These adjustments will be further useful in establishing the average radius or belt circle about sheaves 20 and 22 and which otherwise might become too small after long use by reason of wear in belt 24.

Modifications of the device are contemplated, for example such as the embodiment shown in FIG. 3. In this arrangement, sheaves 20 and 22, preferably identical with those heretofore described, are arranged on shafts 16 and 18 in the same manner as in the FIG. 1 embodiment, and these sheaves are controlled by thrust block assemblies 146 and 148. Thrust block assembly 146 includes thrust block elements 78 and 80 which are in the present instance identical with their counterparts in FIG. 1, while thrust block assembly 148 includes thrust block elements 50 and 56 similarly identical with their counterparts in FIG. 1. Thrust block assemblies 146 and 148 are controlled in a manner analogous to thrust block assemblies 26 and 28, assembly 148 having wedging or camming means 150 interposed between thrust block elements 50 and 56 on one side of shaft 18 and a wedging or camming means 152 similarly interposed on the other side of shaft 18.

Camming means 150 and 152 are preferably in the form of wedges of the same contour as camming means 52 and 54, as seen in FIG. 2, so that when they are urged inwardly or toward shaft 18, thrust block elements 50 and 56 will be forced apart and will compress sheave 22 in the same manner as described in connection with FIGS. 1 and 2.

In similar manner thrust block element 146 has wedging means 154 and 156. Thrust block element 146 operates in a manner identical to thrust block element 148 just described, and it is therefore possible by compressing one sheave while relaxing or allowing the other to expand by suitable operation of thrust block assemblies 148 and 146, to control the ratio of the drive between sheaves 20 and 22 in FIG. 3, by controlling the effective pitch circle of belt 24 as it runs in sheaves 20 and 22.

As hereinbefore stated, various means are contemplated to so control thrust block assemblies 146 and 148, and in the present embodiment control shafts 158 and 160 are extended transversely to, and one on either side of, shaft 18, journaled in wedging means 150 and threaded in wedging means 152. Shaft 158 has fixed thereon a sprocket 162 which actuates by means of a chain 164, a sprocket 166 fixed on shaft 160, and a thrust bearing 168 is interposed between sprocket 162 and wedging means 150, a similar thrust bearing 170 being interposed between sprocket 166 and wedging means 150. Rotation of shaft 158 as for example by means of a hand wheel 172 fixed on shaft 158, will cause similar rotation of shaft 160. The rotation of shafts 158 and 160 in one direction will pull wedging means 152 toward shaft 18 while, through thrust bearings 168 and 170, it will press wedging means 150 toward shaft 18, thereby expanding thrust block assembly 148 and compressing sheave 22. Rotation of shaft 158 in the other direction will allow wedging means 152 and 150 to be forced out or away from shaft 18 by the expanding tendency of sheave 22 caused by the pressure of belt 24, as in the case of the FIG. 1 embodiment.

Thrust block assembly 146 is controlled in a similar manner to contract when thrust block assembly 148 expands, and to expand when thrust block 148 contracts.

For this purpose, a shaft 174 extends through wedging means 154 and 156 on one side of shaft 16, and a shaft 176 extends through wedging means 154 and 156 on the other side of shaft 16. Shaft 174 is journaled in wedging means 156 and threaded in wedging means 154, and has a thrust bearing 178 engaged with wedging means 156. In similar manner shaft 176 is journaled in wedging means 156 and threaded in wedging means 154 and has a thrust bearing 180 engaged with wedging means 156. The threaded connections between shafts 174 and 176 with wedging means 154 are so oriented that rotation of shaft 174 in the same direction as shaft 158 will have the opposite effect on thrust block assembly 146 to that which it will have on thrust block assembly 148. The same is true of shafts 160 and 176. In the present instance, this is done by having wedging means 152 and 154, or in other words the wedging means positioned between shafts 16 and 18 threaded to the several shafts 158, 160, 174, and 176, while wedging means 150 and 156 are engaged by the several thrust bearings described. With all of the threads being of the same hand, rotation of shafts 158 and 174 in the same direction will move wedging means 152 for example, toward shaft 18, while at the same time it moves wedging means 154 away from shaft 16. As will be apparent, this will expand thrust block assembly 148, while it will relax thrust block 146 and allow sheave 20 to expand.

Shafts 158 and 174 are arranged on a common axis, as are shafts 160 and 176, and an extension shaft 182, presently in the form of a tube, is extended between shafts 158 and 174 and connected thereto respectively by pins 184 and 186. Shaft 174 will therefore be compelled to partake of the same rotation as shaft 158. In similar manner, a tube 188 connects shafts 160 and 176, being connected in driving relation thereto by pins 190 and 192. In practice, the fit of tubes 182 and 188 on the several shafts is preferably slightly loose, as is the fit of pins 184, 186, 190 and 192, in the respective shafts so that there is slight freedom of motion to allow the shafts to be located by their engagement with the several wedging means and to be entirely independent of each other rotationally.

The slight tendency of thrust block assemblies 146 and 148 to rotate with shafts 16 and 18 is resisted by a stabilizing rod 194 extended between wedging means 154 and wedging means 152, and preferably rod 194 is free for limited sliding movement in a bore 196 in wedging means 152 so that it will not interfere with the movement of either wedging means in the event there is some minor difference in the amount of movement imparted by threaded shafts 158, 174, etc.

As in the case of the FIG. 1 embodiment, this device "rides" on shafts 16 and 18 and needs no other support or reference points on the machine to which the device is applied. As in the case of the FIG. 1 embodiment, the forces exerted by the wedging means balance each other entirely, and there is no resultant thrust either axially or laterally on shafts 16 and 18 resulting from the action of the wedging means.

A remote control for the device may be applied in a manner analogous to the FIG. 1 embodiment, a sprocket 196 on shaft 158 being rotatable by a chain 198 which may be led to a convenient point to be actuated by a suitable control, not shown. A suitable pulley might be substituted for sprocket 196 and actuated by a belt as in the previous arrangement, within the contemplation of the invention.

The operation of the device should be clear from the foregoing, it being apparent that rotation of pulley 34 in FIG. 1 will cause expansion or contraction of sheave 22, and that such motion will be accompanied by opposite motion of sheave 20 so that belt 24 will run on a larger pitch circle in one sheave while running on a smaller pitch circle in the other. At the same time, any side thrust caused by either wedging means 84 or 82 is balanced and therefore neutralized by an equivalent and opposite side thrust by wedging means 52 and 54, respectively.

Furthermore, any thrust in compression member 32 tending to separate shafts 16 and 18 will be neutralized by an equal and opposite pull in rods 30 and 31.

Also any outward thrust axially of shaft 18 of thrust block element 56 against abutment 60 will be balanced and neutralized by an equal and opposite axial thrust against flange 38. The same is true in case of sheave 20.

As a result of the balancing of these various forces, there is no resultant force on either of shafts 16 or 18 caused by the control mechanism, the latter merely riding on the shafts and reacting solely to compress sheaves 20 and 22 or to allow them to expand as required. Any side thrust introduced by the pull of adjusting belt 116 is minimal, and insignificant, as compared with the forces dealt with and neutralized as described, and may be neglected.

Insofar as the operation of the FIG. 3 embodiment is concerned, it is pointed out that the result is the same as with the FIG. 1 embodiment, although the mode of achieving it is distinct. Parallel threaded rods or screws 158 and 160 pull wedging elements 150 and 152 inwardly between thrust block elements 50 and 56, thus forcing them apart and compressing sheave 22. Any side thrust imparted to shaft 18 by one of the wedging means is balanced by an equal and opposite side thrust imparted by the other wedging means, so that there is no resultant side thrust on shaft 18. The same is true of wedging means 154 and 156 as related to shaft 16, screws 158 and 160 being connected respectively with screws 174 and 176 for rotation only so that the two thrust block assemblies 146 and 148 are independent, each neutralizing any side thrust within itself, and not passing it on to the other.

Variations on the above will doubtlessly occur to others skilled in the art, and the invention is not to be taken as limited to the exact structure disclosed, nor in fact, in any manner except as defined in the following claims.

What is claimed as new and desired to be secured by Letters Patent of the United States is:

1. In a variable speed drive of the type including
   a pair of spaced rotatable shafts, a compressible V-belt sheave on each shaft, and a V-belt engaged about said sheaves; means for compressing said V-belt sheaves including an
   expansible thrust block structure carried on each shaft and engaged with one of said V-belt sheaves
   opposed wedging means carried on and in expanding engagement with each of said thrust block structures, and
   means connected to said opposed wedging means and constituted to expand one of said thrust block structures while allowing the other to contract and rotary means for actuating said wedging means.

2. In a variable speed drive of the type including
   a pair of spaced rotatable shafts, a compressible V-belt sheave on each shaft, and a V-belt engaged about said sheaves; means for compressing said V-belt sheaves including an
   expansible thrust block structure on each shaft engaged with one of said V-belt sheaves,
   opposed camming means carried on and in expanding engagement with each of said thrust block structures, and
   thrust transmitting threaded means connected to at least one of said opposed camming means and constituted to actuate said camming means to expand one of said thrust block structures while allowing the other to contract.

3. In a variable speed drive of the type including
   a pair of spaced rotatable shafts, a compressible V-belt sheave on each shaft, and a V-belt engaged about said sheaves; means for compressing said V-belt sheaves including an
   expansible thrust block structure on each shaft engaged with one of said V-belt sheaves,
   opposed wedging means carried on and in expanding engagement with each of said thrust block structures, and
   means including interengaging threaded members connected to said opposed wedging means and constituted to expand one of said thrust block structures while allowing the other to contract and rotary means for actuating said wedging means.

4. In a variable speed drive of the type including
   a pair of spaced rotatable shafts, a compressible V-belt sheave on each shaft, a V-belt engaged about said sheaves, and means for compressing said V-belt sheaves including an
   expansible thrust block structure carried on each shaft engaged with one of said V-belt sheaves,
   opposed wedging means carried on and in expanding engagement with each of said thrust block structures,
   thrust transmitting threaded means connected to at least one of said opposed wedging means and constituted to expand one of said thrust block structures while allowing the other to contract, and means connected to the opposed wedging means of one of said thrust block structures for actuating said wedging means to cause said thrust block structure to expand.

5. In a variable speed drive of the type including
a pair of spaced rotatable shafts, a compressible V-belt sheave on each shaft, a V-belt engaged about said sheaves, and means for compressing said V-belt sheaves including an
expansible thrust block structure on each shaft engaged with one of said V-belt sheaves,
opposed wedging means carried on and in expanding engagement with each of said thrust block structures,
means including interengaging threaded members connected to said opposed wedging means and constituted to expand one of said thrust block structures while allowing the other to contract, and
means connected to rotate said threaded members for actuating said wedging means to cause said thrust block structures to expand and contract.

6. In a variable speed drive of the type including
a pair of spaced parallel rotatable shafts, a compressible V-belt sheave on each shaft, and a V-belt engaged about said sheaves, means for compressing said V-belt sheaves including an
expansible thrust block structure on each shaft engaged with one of said V-belt sheaves,
opposed outwardly directed wedging means between said shafts, carried on and in expanding engagement with each of said thrust block structures,
thrust transmitting threaded means connected to and between said opposed outwardly directed wedging means,
opposed inwardly directed wedging means carried on and in expanding engagement with each of said thrust block structures,
tension means connected to and between said inwardly directed wedging means, whereby expanding one of said thrust block structures by forcing its respective wedging means therein will provide for the forcing of the other wedging means out of the other thrust block structure to allow said other thrust block structure to contract, and
means connected to the opposed wedging means of one of said thrust block structures for actuating said wedging means to cause said thrust block structure to expand.

7. In a variable speed drive of the type including
a pair of spaced rotatable shafts, a compressible V-belt sheave on each shaft, a V-belt engaged about said sheaves, and means for compressing said V-belt sheaves including an
expansible thrust block structure carried on each shaft engaged with one of said V-belt sheaves,
opposed wedging means carried on and in expanding engagement with each of said thrust block structures,
thrust transmitting means connected to said opposed wedging means and constituted to expand one of said thrust block structures while allowing the other to contract, and
means connected to the opposed wedging means of one of said thrust block structures
including a rotatable control element for actuating said wedging means to cause said thrust block structure to expand, and means on said rotary control element for rotating the same.

8. In a variable speed drive of the type including
a pair of spaced rotatable shafts, a compressible V-belt sheave on each shaft, a V-belt engaged about said sheaves, and means for compressing said V-belt sheaves including an
expansible thrust block structure carried on each shaft engaged with one of said V-belt sheaves,
opposed wedging means carried on and in expanding engagement with each of said thrust block structures,
thrust transmitting means connected to said opposed wedging means and constituted to expand one of said thrust block structures while allowing the other to contract, and
means connected to the opposed wedging means of one of said thrust block structures
including a rotatable element for actuating said wedging means to cause said thrust block structure to expand, and means including a
driven wheel fixed on said rotary control element and a flexible element engaged about said driven wheel and leading to a remote control point for rotating the same.

9. In a variable speed drive of the type including
a support,
a pair of spaced rotatable shafts on said support, a compressible V-belt sheave on each shaft, a V-belt engaged about said sheaves, a wedge block riding on each shaft and expansible to compress one of said sheaves, each of said wedge blocks including a pair of opposed wedging elements directed toward their respective shafts, and means for preventing rotation of said wedge blocks with said shafts comprising a
stabilizer rod extended between and engaged with said wedge blocks.

10. In a variable speed drive of the type including
a support,
a pair of spaced rotatable shafts on said support, a compressible V-belt sheave on each shaft, a V-belt engaged about said sheaves, and a wedge block riding on each shaft and expansible to compress one of said sheaves, each of said wedge blocks including a pair of opposed
wedging elements directed toward their respective shafts, a
screw element engaged with one of said pair of wedging elements constituted to force said wedging elements toward each other when said screw element is rotated in one direction, a
screw element engaged with the other pair of wedging elements constituted to force said wedging elements toward each other when rotated in the opposite direction to the first-mentioned screw element,
flexible means connecting said screw elements to compel rotation of one in the same direction as, and by reason of rotation of the other, and
means for rotating one of said screw elements.

11. In a variable speed drive of the type including
a support,
a pair of spaced rotatable shafts on said support, a compressible V-belt sheave on each shaft, a V-belt engaged about said sheaves, and a wedge block riding on each shaft and expansible to compress one of said sheaves, each of said wedge blocks including a pair of opposed
wedging elements directed toward their respective shafts, a
screw element engaged with one of said pair of wedging elements, a
nut element threaded on said screw element,
means for rotating said screw and nut element relative to each other, and
means connecting said nut element with the other of said pair of wedging elements so that that relative rotation of said screw and nut elements will cause opposite translation of the wedges of said pair.

12. In a variable speed drive of the type including
a support,
a pair of spaced rotatable shafts on said support, a compressible V-belt sheave on each shaft, a V-belt engaged about said sheaves, and a wedge block riding on each shaft and expansible to compress one of said sheaves, each of said wedge blocks including a pair of opposed wedging elements directed toward their respective shafts, a
lever arm pivotally secured on said support, a
belt tightener sheave journaled on said lever arm spaced from the pivotal connection of said lever arm to said support, and engaged with said V-belt, and
means engaged with said lever arm arranged to yieldingly urge said belt tightener sheave in a belt tightening direction.

13. In a variable speed drive of the type including a pair of spaced parallel rotatable shafts, a sheave on each of said shafts each comprising a first belt engaging flange fixed on its respective shaft and a second belt engaging flange slidably but non-rotatably supported on said respective shaft, spaced axially of said shaft from said first belt engaging flange, and a belt disposed about said sheaves in engagement with said flanges and tending to force each of said second belt engaging flanges away from said first belt engaging flanges, and means for urging said second belt engaging flanges toward said first belt engaging flanges comprising a first
  thrust block slidably journaled on each of said shafts spaced from said first belt engaging flanges beyond said second belt engaging flanges, in axial engagement with said second belt engaging flanges, a
  second thrust block journaled on each of said shafts spaced from said flanges beyond said first thrust block and fixed axially in relation to its respective shaft, first
  wedging means interposed between the first and second thrust blocks on one shaft and between it and the other shaft, second
  wedging means interposed between the first and second thrust blocks of the other shaft and between said shafts, said wedging means being constituted to separate said first and second thrust blocks by reason of movement toward their respective shafts, a
  compression member connecting said wedging means between said shafts, third
  wedging means interposed between the first and second thrust blocks on one shaft outwardly of the space between said shafts, fourth
  wedging means interposed between the first and second thrust blocks on the other shaft outwardly of the space between said shafts, said third and fourth wedging means also being constituted to separate said first and second thrust blocks by reason of movement toward their respective shafts,
  tension means connected to said third wedging means and to said fourth wedging means to prevent movement of said wedging means in a direction away from each other, and
  means connected to said first wedging means and to said third wedging means and arranged to force said first and third wedging means toward and away from each other when desired.

14. In a variable speed drive of the type including a pair of spaced parallel rotatable shafts, a sheave on each of said shafts each comprising a first belt engaging flange fixed on its respective shaft and a second belt engaging flange slidably but non-rotatably supported on said respective shaft, spaced axially of said shaft from said first belt engaging flange, and a belt disposed about said sheaves in engagement with said flanges and tending to force each of said second belt engaging flanges away from said first belt engaging flanges, and means for urging said second belt engaging flanges toward said first belt engaging flanges comprising a first
  thrust block slidably journaled on each of said shafts spaced from said first belt engaging flanges beyond said second belt engaging flanges, in axial engagement with said second belt engaging flanges, a
  second thrust block journaled on each of said shafts spaced from said flanges beyond said first thrust block and fixed axially in relation to its respective shaft, first
  wedging means interposed between the first and second thrust blocks on one shaft and between it and the other shaft, second
  wedging means interposed between the first and second thrust blocks of the other shaft and between said shafts, said wedging means being constituted to separate said first and second thrust blocks by reason of movement toward their respective shafts, a
  compression member adjustable in length, connecting said wedging means between said shafts, third
  wedging means interposed between the first and second thrust blocks on one shaft outwardly of the space between said shafts, fourth
  wedging means interposed between the first and second thrust blocks on the other shaft outwardly of the space between said shafts, said third and fourth wedging means also being constituted to separate said first and second thrust blocks by reason of movement toward their respective shafts,
  tension means, adjustable in length, connected to said third wedging means and to said fourth wedging means to prevent movement of said wedging means in a direction away from each other, and
  means connected to said first wedging means and to said third wedging means and arranged to force said first and third wedging means toward each other when desired.

15. In a variable speed drive of the type including a pair of spaced parallel rotatable shafts, a sheave on each of said shafts each comprising a first belt engaging flange fixed on its respective shaft and a second belt engaging flange slidably but non-rotatably supported on said respective shaft, spaced axially of said shaft from said first belt engaging flange, and a belt disposed about said sheaves in engagement with said flanges and tending to force each of said second belt engaging flanges away from said first belt engaging flanges, and means for urging said second belt engaging flanges toward said first belt engaging flanges comprising a first
  thrust block slidably journaled on each of said shafts spaced from said first belt engaging flanges beyond said second belt engaging flanges, in axial engagement with said second belt engaging flanges, a
  second thrust block journaled on each of said shafts spaced from said flanges beyond said first thrust block and fixed axially in relation to said shaft, first
  wedging means interposed between the first and second thrust blocks on one shaft and between it and the other shaft, second
  wedging means interposed between the first and second thrust blocks of the other shaft and between said shafts, said wedging means being constituted to separate said first and second thrust blocks by reason of movement toward their respective shafts,
  wedging means interposed between the first and second thrust blocks on one shaft outwardly of the space between said shafts, fourth
  wedging means interposed between the first and second thrust blocks on the other shaft outwardly of the space between said shafts, said third and fourth wedging means also being constituted to separate said first and second thrust blocks by reason of movement toward their respective shafts,
  threaded means threadedly connected to said first wedging means and to said second wedging means, said threaded means being also connected in thrust transmitting relation with said third wedging means and with said fourth wedging means, and
  means for rotating said threaded means for shifting said first and said second wedging means simultaneously in one direction in relation to said third and fourth wedging means whereby to separate said first and second thrust blocks on one shaft while providing for said first and second thrust blocks on the other shaft to approach each other.

16. In a variable speed drive of the type having spaced driving and driven shafts, a compressible V-belt sheave on each shaft, and a V-belt drivingly engaged about said sheaves, means for compressing said V-belt sheaves including expansible thrust block structures on said shafts engaged with said V-belt sheaves, an outer wedge in each thrust block structure outside of the space between said shafts, said outer wedge being engageable with said thrust block structure, tension means connecting said outer wedges, an inner wedge in each thrust block structure inside of the space between said shafts, compression means connecting said inner wedges and means engaged with one of the outer wedges and with one of the inner wedges adapted to shift said wedges toward and away from each other.

17. In a variable speed drive of the type including a pair of spaced shafts, disposed in spaced substantially parallel planes, a compressible V-belt sheave on each shaft, and a V-belt engaged about said sheaves, means for compressing said V-belt sheaves including an expansible thrust block structure carried on each shaft and engaged with one of said V-belt sheaves, an outer wedge in each thrust block structure, disposed outwardly of said shafts as related to the space between said shafts, an inner wedge in each thrust block structure, disposed inwardly of said shafts as related to the space between said shafts, tension means connecting one of said outer wedges with the other outer wedge, compression means connecting one of said inner wedges with the other inner wedge, and actuating means engaged with one of said outer wedges and with one of said inner wedges, and adapted to shift the last mentioned wedges toward each other upon actuation in one direction, and away from each other upon actuation in the other direction.

References Cited by the Examiner

UNITED STATES PATENTS

| 1,236,749 | 8/1917 | Osser | 74—230.17 |
| 2,663,195 | 2/1953 | Horan | 74—242.11 |
| 2,702,484 | 2/1955 | Arata | 74—230.17 |

FOREIGN PATENTS

| 20,640 | 8/1914 | Great Britain. |
| 707,483 | 4/1954 | Great Britain. |

DAVID J. WILLIAMOWSKY, *Primary Examiner.*

L. H. GERIN, *Assistant Examiner.*